Figure 1:
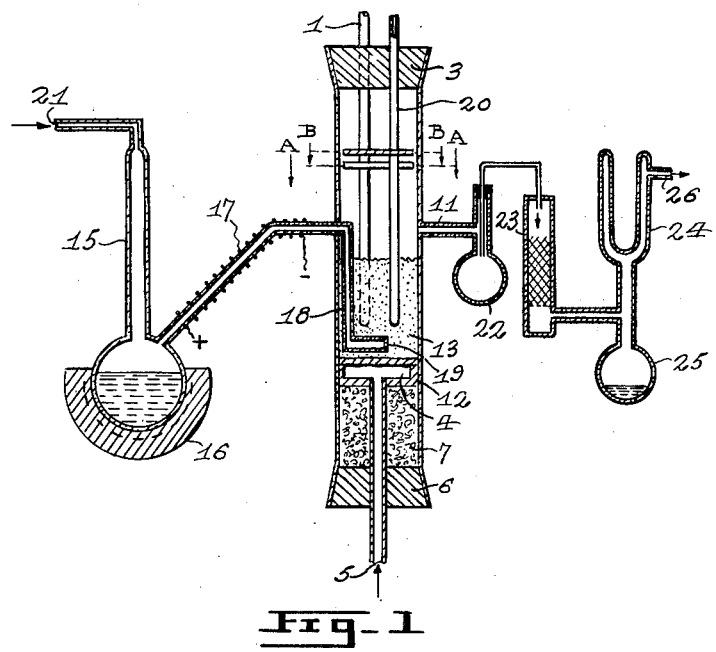

May 15, 1962     H. S. JOHNSON ETAL     3,034,863

PROCESS FOR PREPARATION OF CARBON DISULPHIDE

Filed March 30, 1959

Inventors
HERBERT S. JOHNSON
JAMES REID

By Heatley and Morrison
Agent

United States Patent Office 3,034,863
Patented May 15, 1962

3,034,863
PROCESS FOR PREPARATION OF
CARBON DISULPHIDE
Herbert S. Johnson and James Reid, Shawinigan, Quebec,
Canada, assignors to Shawinigan Chemicals Limited,
Montreal, Quebec, Canada, a corporation of Canada
Filed Mar. 30, 1959, Ser. No. 802,910
5 Claims. (Cl. 23—206)

This invention relates to the preparation of carbon disulphide by reaction of sulphur vapour with carbon. Carbon disulphide is produced commercially by this reaction on a large scale. Commercial processes generally employ externally-fired reactors or reactors which are heated internally by the passage of an electric current through a stationary bed of carbon. Alternatively, preheating of the sulphur vapour is sometimes employed to provide some or all of the heat required by the process.

The use of a special grade of charcoal as the carbon source for this reaction has been common practice, because charcoal has adequate reactivity at readily attainable temperatures, whereas other cheaper forms of carbon require higher temperatures, or extremely fine comminution, or other expensive preliminary preparation. The principal disadvantages of charcoal is its relatively high cost, and a second disadvantage is its ash content, which in some cases is high enough to form slag, which is a nuisance to have to remove from the reactor.

Petroleum coke has become available in a fine particulate form prepared by the process known in industry as the fluid coking process. This process for preparing petroleum coke is described, for example, in U.S. Patent 2,721,169, Mason et al., and in U.S. Patent 2,789,037, Kimberlin et al. It has already been proposed to use such petroleum coke, prepared by the fluid coking process, in the preparation of carbon disulphide from carbon and sulphur vapour, by fluidizing the coke in the sulphur vapour and product gas, with the heat of reaction being provided by the sensible heat of the reactants at the elevated temperatures at which they enter the reactor. This process suffers from substantial drawbacks. Ferguson, U.S. Patent 2,480,639, shows the need for a carbon reheating stage and Kimberlin et al., U.S. Patent 2,789,037, show a separate vessel for heating the carbon. Even more important is the handicap, shown by Kimberlin et al., of the low reactivity of this coke as produced and the consequent necessity to give the coke a low temperature oxidation pretreatment.

It is an object of the present invention to provide a process for the manufacture of carbon disulphide in which an inexpensive carbon can be reacted with sulphur without pretreatment. It is a further object to provide a process in which the heat necessary to sustain the reaction is supplied electrically within the fluidized bed. Electrical heating applied to a fluidized bed has an important advantage over electrical heating of a fixed bed, as practised previously, in assuring a uniform path both for the electric current and for the gaseous reactants and products.

This invention consists in a process for the preparation of carbon disulphide which comprises (a) passing a stream of gas comprising elementary sulphur vapour upwardly through a bed comprising finely-divided electrically conductive petroleum coke particles made by the fluid coking process, (b) maintaining the particles of the bed in a fluidized state by the passage of said gas upwardly therethrough, (c) passing an electric current through the resulting fluidized bed with sufficient power to maintain it at a temperature which sustains the reaction between the sulphur and the carbon particles, and (d) recovering carbon disulphide from the gas stream emerging from the fluidized bed.

In preferred embodiments of the invention, the fluidized bed is maintained at a temperature within the range 700° C. to 1500° C., most preferably 900° C. to 1200° C., to sustain the reaction between the sulphur and carbon particles. Also in preferred embodiments of the invention, the contact time between the carbon particles in the fluidized bed and the gas as it passes through the bed is between 0.5 and 30 seconds, the longer times being applicable to large reactors.

As produced in a fluid coking process the particles of petroleum coke to be used in this invention usually have an extremely high electrical resistivity. For example, the resistance between two parallel cylindrical graphite electrodes, one-quarter inch in diameter, one-half inch apart, and immersed to a depth of one inch in a cold stationary bed of coke, may be as high as 500 megohms. For the initial operation of a new charge of coke the resistance must be such that available voltages will permit an input of power sufficient to heat the charge to operating temperature in a reasonable time. Calcination in a variety of ways reduces the resistance of the coke as measured above to a value usually in the range of 10 to 40 ohms.

For example, the coke may be heated to about 700° C. in a thin layer for a few minutes or to 900° C. for a few seconds. No harm is done if the heating is continued except, of course, a loss of weight if the coke is exposed to air. Heating periods up to two hours have been used.

Figure 3:
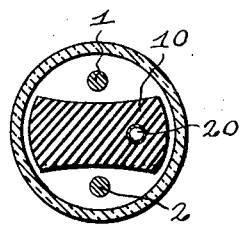
Figure 2:
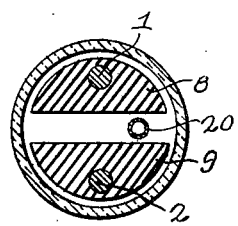

A simple apparatus for carrying out the process of the invention is illustrated in the accompanying drawings in which FIGURE 1 illustrates diagrammatically the arrangement of the elements of a suitable apparatus, FIGURE 2 shows a cross-section of the reactor part of the apparatus on the line A—A of FIGURE 1, and FIGURE 3 shows a cross-section of the same reactor on the line B—B of FIGURE 1. FIGURE 1 shows a reactor tube 12, suitably of glass or refractory ceramic, closed at the bottom by a closure 6, through which a gas inlet line 5 leads to a gas disperser 4, of which suitably the body is graphite and the top is porous carbon. The space between the disperser 4 and the closure 6 is filled with thermal insulation 7, for example, petroleum coke particles. A gas outlet 11 is arranged in the wall of the reactor above the surface of a bed of petroleum coke particles 13, but well below a top closure 3. Electrodes 1 and 2 pass through the top closure 3, as does a thermocouple well 20. Radiation shields 8, 9, 10 (FIGURES 2 and 3) are supported from the electrodes and thermocouple well, as shown in FIGURE 1. Electrodes 1 and 2 extend into the bed of fine particles 13 to be fluidized by gas entering at 4 or diffuser 19 or both. Sulphur is refluxed in a flask 15, heated by heater 16, under a controlled pressure in inert gas applied through inlet 21. Some of the sulphur vapour passes through a heated line 17 to a superheater 18, which passes through the fluid bed 13 and terminates in the diffuser 19. The gas outlet 11 leads to a trap 22, a filter 23, and a condenser 24, with its receiver 25 and vent 26.

The process of the invention is illustrated, but not limited, by the following example.

The reactor and associated apparatus used for this example were assembled as shown in FIGURE 1. The reactor tube was of "Vycor," a commercial glass resistant to high temperature, having inside and outside diameters of 34 and 38 mm. respectively. The electrodes were one-quarter inch graphite rods connected to an alternating current supply of adjustable voltage, and penetrating the fluid bed to a depth of approximately one inch. The other components were of standard design. The bed consisted of a depth of about four inches of petroleum coke particles made by a commercial petroleum fluid coking process from petroleum residues. The coke was preliminarily screened to remove particles over 14 mesh (U.S. Standard Sieve) in size. This coke, as received, had no effective electrical conductivity, but it was made conductive by holding it at a temperature of about 900° C. for two hours.

Nitrogen was fed to the apparatus at inlet 5, at a rate of approximately 200 ml. per minute, measured at 70° F., 1 atmosphere absolute pressure, to fluidize the bed. The alternating current source was then connected and the voltage adjusted to give a current of 10 amperes at 175 volts. When the bed had attained a temperature of 1050° C., sulphur vapour was fed into the reactor by adjusting the nitrogen pressure at inlet 21 to give a continuous flow of sulphur vapour maintaining substantially uniform fluidizing conditions. While the sulphur vapour flow was being established, the nitrogen flow to inlet 5 was correspondingly reduced to a low value, finally approximately to about 50 ml. per minute. This nitrogen flow was maintained to ensure that fluidization would not cease entirely if, for any reason, the flow of sulphur vapour should be interrupted. The combined flow of sulphur vapour and nitrogen was maintained substantially volumetrically equal to the original nitrogen flow. Hence the feed of sulphur vapour to the reactor could be assumed to be the fluidizing equivalent of 150 ml. per minute of nitrogen, at 70° F., 1 atmosphere pressure. It is known that, at high temperatures, sulphur is present predominantly as the diatomic molecule $S_2$; accordingly the gravimetric flow rate of sulphur vapour in the reactor could be calculated as approximately 0.43 gram per minute.

At the end of 30 minutes of operation, during which the temperature varied between 1050° C. and 1200° C., the reactor was shut down. The receiver was found to contain 9.0 ml., approximately 11.4 gm., of carbon disulphide, identified by its odor, specific gravity, and refractive index; this amount was equivalent to 9.6 gm. of sulphur. Conversion of sulphur to carbon disulphide was thus about 75% in the small-scale single short pass operation. Unconverted sulphur was found condensed in the trap 22, filter 23, and connections leading thereto. No uncondensed sulphur was found beyond the filter. A great deal of the unconverted sulphur was observed to be condensing and accumulating during irregular surges of abnormally high sulphur vapour flow into the reactor; maintenance of more uniform sulphur feed to the reactor would apparently have reduced the accumulation of unreacted sulphur and increased the percentage conversion.

It will be clear that the equipment for a commercial plant can differ from the laboratory unit in materials of construction and in details of design, and the process can differ in numerous details. For example, if it is desired to calcine the fluid petroleum coke to rid it of its volatile matter, particularly hydrogen containing materials, before committing it to the $CS_2$ reactor, this can be done in a seperate electrically heated fluid bed reactor fluidized by an inert gas, preferably nitrogen, to which uncalcined ("green") coke is fed continuously, and from which a product coke is continuously removed, to be used as coke feed to the carbon disulphide reactor. This calcination, as well as eleminating unwanted volatile matter, can serve to render the coke electrically conductive. Alternatively, "green" coke can be added directly to a carbon disulphide reactor at frequent intervals to replace coke consumed in the reaction, and calcination of the "green" coke occurs in situ, and adequate electrical conductivity of the coke is thereby maintained.

Neither of the methods of calcination given in the previous paragraph involves the use of an oxidization pretreatment as proposed in the prior art to increase the surface area and thus increase the reactivity of the coke. Nevertheless, the productivity of the calcined but unoxidized coke in the process of this invention is unexpectedly and surprisingly high. Thus, space-time yields as high at 60 pounds of carbon disulphide per cubic foot of reactor space per hour can and have been achieved in small reactors such as used in the example; such high space-time yields require undesirably high sulphur vapour flow rates which give rise to relatively low sulphur conversions of about 25%. However, space-time yields around 20 pounds per cubic foot per hour have been obtained with sulphur conversions around 70%, and these yields and conversions are readily obtainable in reactors of the size used in the example and in larger reactors. These figures contrast remarkably with characteristics of conventional externally-fired carbon disulphide retorts which produce usually in the range of 0.36 to 2.5 pounds of carbon disulphide per cubic foot of reactor space per hour. Taylor type carbon disulphide retorts, using electric resistance heating, produce in the range around 0.07 to 0.12 pound of carbon disulphide per cubic foot per hour.

This application is a continuation-in-part of application Serial No. 627,427, filed December 10, 1956, now abandoned.

What is claimed is:
1. A process for the preparation of carbon disulphide which comprises (a) passing a stream of gas compising elementary sulphur vapour upwardly through a bed comprising finely-divided electrically conductive petroleum coke particles made by the fluid coking process and previously unoxidized, (b) maintaining the particles of the bed in a fluidized state by the passage of said gas upwardly therethrough, (c) passing an electric current through the resulting fluidized bed with sufficient power to maintain it at a temperature in the range of 700° to 1500° C., and (d) recovering carbon disulphide from the gas stream emerging from the fluidized bed.

2. A process as claimed in claim 1, in which the fluidized bed is maintained at a temperature in the range 900° to 1200° C.

3. A process as claimed in claim 1 in which the contact time between the carbon particles and the gas passing through the fluidized bed is between 0.5 and 30 seconds.

4. A process as claimed in claim 1 in which the stream of gas also contains nitrogen.

5. A process as claimed in claim 1 in which the coke removed from the bed by reaction to carbon disulphide is replaced by precalcined petroleum coke.

References Cited in the file of this patent
UNITED STATES PATENTS

| | | |
|---|---|---|
| 1,857,799 | Winkler | May 10, 1932 |
| 2,708,156 | Paoloni | May 10, 1955 |
| 2,789,037 | Kimberlin et al. | Apr. 16, 1959 |

FOREIGN PATENTS

| | | |
|---|---|---|
| 646,711 | Great Britain | Nov. 29, 1950 |
| 486,848 | Italy | Nov. 18, 1953 |